US008437537B2

(12) United States Patent
Chang et al.

(10) Patent No.: US 8,437,537 B2
(45) Date of Patent: *May 7, 2013

(54) METHOD AND SYSTEM FOR ESTIMATING 3D POSE OF SPECULAR OBJECTS

(75) Inventors: Ju Yong Chang, Seoul (KR); Amit Kumar Agrawal, Somerville, MA (US); Ashok N. Veeraraghavan, Cambridge, MA (US); Ramesh N. Raskar, Cambridge, MA (US); Jay E. Thorton, Watertown, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 932 days.

This patent is subject to a terminal disclaimer.

(21) Appl. No.: 12/509,860

(22) Filed: Jul. 27, 2009

(65) Prior Publication Data

US 2010/0296724 A1 Nov. 25, 2010

Related U.S. Application Data

(63) Continuation-in-part of application No. 12/412,452, filed on Mar. 27, 2009.

(60) Provisional application No. 61/165,406, filed on Mar. 31, 2009.

(51) Int. Cl.
*G06K 9/00* (2006.01)

(52) U.S. Cl.
USPC ........... 382/154; 382/100; 382/285; 382/289; 345/419

(58) Field of Classification Search .................. 382/100, 382/154, 285–289, 293–296; 345/419, 420, 345/427

See application file for complete search history.

(56) References Cited

U.S. PATENT DOCUMENTS

| | | | | |
|---|---|---|---|---|
| 5,802,201 A | * | 9/1998 | Nayar et al. | 382/153 |
| 6,590,669 B1 | * | 7/2003 | Wagner | 356/601 |
| 6,628,298 B1 | * | 9/2003 | Debevec | 345/632 |
| 6,697,062 B1 | * | 2/2004 | Cabral et al. | 345/419 |
| 6,956,569 B1 | * | 10/2005 | Roy et al. | 345/426 |
| 7,756,325 B2 | * | 7/2010 | Vetter et al. | 382/154 |
| 7,957,583 B2 | * | 6/2011 | Boca et al. | 382/154 |
| 8,090,160 B2 | * | 1/2012 | Kakadiaris et al. | 382/118 |
| 2005/0074162 A1 | * | 4/2005 | Tu et al. | 382/154 |
| 2008/0030744 A1 | * | 2/2008 | Beardsley | 356/601 |
| 2010/0245355 A1 | * | 9/2010 | Chang | 345/426 |

OTHER PUBLICATIONS

Eric Huber and Keneth Baker, "Using a Hybrid of Silhouette and Range Templates for Real-time Pose Estimation", IEEE, Proceedings of the 2004 IEEE International Conference on Robotics and Automation, vol. 2, Apr. 2004, pp. 1652-1657.*

* cited by examiner

*Primary Examiner* — Eric Rush (74) *Attorney, Agent, or Firm* — Gene Vinokur; Dirk Brinkman (57) ABSTRACT

A method estimates a 3D pose of a 3D specular object in an environment. In a preprocessing step, a set of pairs of 2D reference images are generated using a 3D model of the object, and a set of poses of the object, wherein each pair of reference images is associated with one of the poses. Then, a pair of 2D input images are acquired of the object. A rough 3D pose of the object is estimated by comparing features in the pair of 2D input images and the features in each pair of 2D reference images using a rough cost function. The rough estimate is optionally refined using a fine cost function.

40 Claims, 4 Drawing Sheets

METHOD AND SYSTEM FOR ESTIMATING 3D POSE OF SPECULAR OBJECTS

RELATED APPLICATIONS

This Continuation-in-Part Non-Provisional Patent Application claims priority to Non-Provisional patent application Ser. No. 12/412,452, "Method for Estimating 3D Pose of Specular Objects," filed by Ju Yong Chang on Mar. 27, 2009, and Provisional Patent Application 61/165406, "Method and for Estimating 3D Pose of Specular Objects," filed by Amit Agrawal on Mar. 31, 2009, both incorporated herein by reference.

FIELD OF THE INVENTION

This invention relates generally to estimating 3D poses of objects, and more particularly to estimating the 3D pose of specular objects.

BACKGROUND OF THE INVENTION

Pose Estimation

Three-dimensional (3D) pose estimation determines the location and angular orientation of an object. Typical, pose estimation methods rely on several cues, such as 2D texture images, and 3D range images. Texture images based methods assume that the texture is invariant to variations of the environment. However, this assumption is not true if there are illumination changes or shadows. In general, most of these methods cannot handle objects that are specular.

Range images based methods can overcome some of these difficulties, because they exploit 3D information that is independent of the appearance of objects. However, range acquisition equipment is more expensive than simple cameras.

Specular Objects

For some objects, it is very difficult to reconstruct the 3D shape. For example, recovering 3D shape of highly specular objects, such as mirror-like or shiny metallic objects is known to be difficult and unreliable.

Reflection cues are more sensitive to pose changes than texture or range cues. Therefore, exploiting the reflection cues enables pose parameters to be estimated very accurately. However, it is not clear whether the reflection cues are applicable to global pose estimation, i.e., object detection, object segmentation, and rough object pose estimation, rather than just pose refinement.

Prior art methods are generally based on appearance, which is affected by illumination, shadows, and scale. Therefore it is difficult for those methods to overcome related problems such as partial occlusions, cluttered scenes, and large pose variations. To handle these difficulties, those methods use illumination invariant features, such as points, lines, and silhouettes, or illumination insensitive cost functions such as a normalized cross correlation (NCC). However, the object needs to be sufficiently textured in order for these methods to be successful. Severe illumination changes remain a problem, especially for specular objects.

A wide range of methods derive sparse local shape information from the identification and tracking of distorted reflections of light sources, and special known features. Dense measurements can also be obtained using a general framework of light-path triangulation. However, those methods usually need to perform accurate calibration and control the environment surrounding the object, and sometimes require many input images.

Some methods for specular object reconstruction do not require environment calibration. Those methods assume small environmental motion, which induces specular flow on the image plane. In those methods, the specular flow is exploited to simplify the inference of specular shapes in unknown complex lighting. However, a pair of linear partial differential equations have to be solved, and generally, that requires an initial condition, which is not easily estimated in real world applications.

One method for estimating the pose based on specular reflection uses a short image sequence and initial pose estimates computed by the standard template matching procedure. Lambertian and specular components are separated for each frame and environment maps are derived from the estimated specular images. Then, the environment maps and the image textures are concurrently aligned to increase the accuracy of the pose estimation process.

SUMMARY OF THE INVENTION

The embodiments of the invention provide a method and system, performed in a processor, for estimating a 3D pose of a 3D specular object in an environment. The basis for the estimation is matching features in 2D images of the specular object, acquired by a 2D camera. The images can be acquired by a conventional camera or by a high dynamic range (HDR) camera, which allows a large range of scene luminance to be accurately acquired by in the image.

In a preprocessing step, features are generated from a 3D model of the object and a set of possible poses of the object. For each pose of the 3D model, the features could be (a) a single HDR image (b) a pair of reference images representing two different exposure settings (c) a HDR image and a thresholded binary image, a camera with a non-linear intensity response, or (d) specular flow image.

It should be noted that the pair of images can be derived from a single HDR image. For better accuracy, images can be acquired for a large number of different exposures.

Then, a pair of input images is acquired of the object. This pair can be obtained either by acquiring two images, one at a short and the other at a long exposure, or from a single HDR camera image through simulating the short and long exposures. Input features are computed from the input images. An initial 3D pose of the object is estimated by comparing the features in the pair of input images with features in the pairs of reference images using a first cost function.

Optionally, the 3D pose of the can be refined using a second cost function. It should be noted that if a database stores a large number of reference images for most possible poses, then the initial pose estimation will be fine and accurate. For example, if the database includes about a thousand poses the estimate would be rough, and if the database stores a million poses the estimate is finer.

In one embodiment, the feature is specular intensity in the images. If three (RGB) channels are used, then the specular intensity features have color, which can make the features more distinct. To construct a 2D environment map, a small mirror-like sphere is arranged in the environment, and the pair of images is acquired, for example, one at a short and the other at a long exposure, or for example, both obtained from a single HDR camera image through simulating the short and long exposures. The sphere can be placed in the scene with or without the object. Other features based on specular reflection are within the scope of this invention.

Each mirror-sphere image is used to construct a 2D environment map. The map is used to generate the pairs of reference images, which are subsequently compared with the pair of input images to estimate the 3D pose of the specular object. It should be noted that the environment map can be constructed during the preprocessing, or while the input images are acquired to adapt for changing illumination.

In another embodiment, the feature is specular flow in the images, which is a special case of optical flow. Specular flows are generated for a set of 3D poses by inducing motion either in the environment or in the camera. Input specular flow is also computed from the input images. The reference specular flow images are subsequently compared with input specular flow images to estimate the 3D pose of the specular object. As before, a fine pose is estimated from a rough pose using rough and fine cost functions.

DETAILED DESCRIPTION OF THE PREFERRED EMBODIMENT

System and Method Overview

Figure 1:
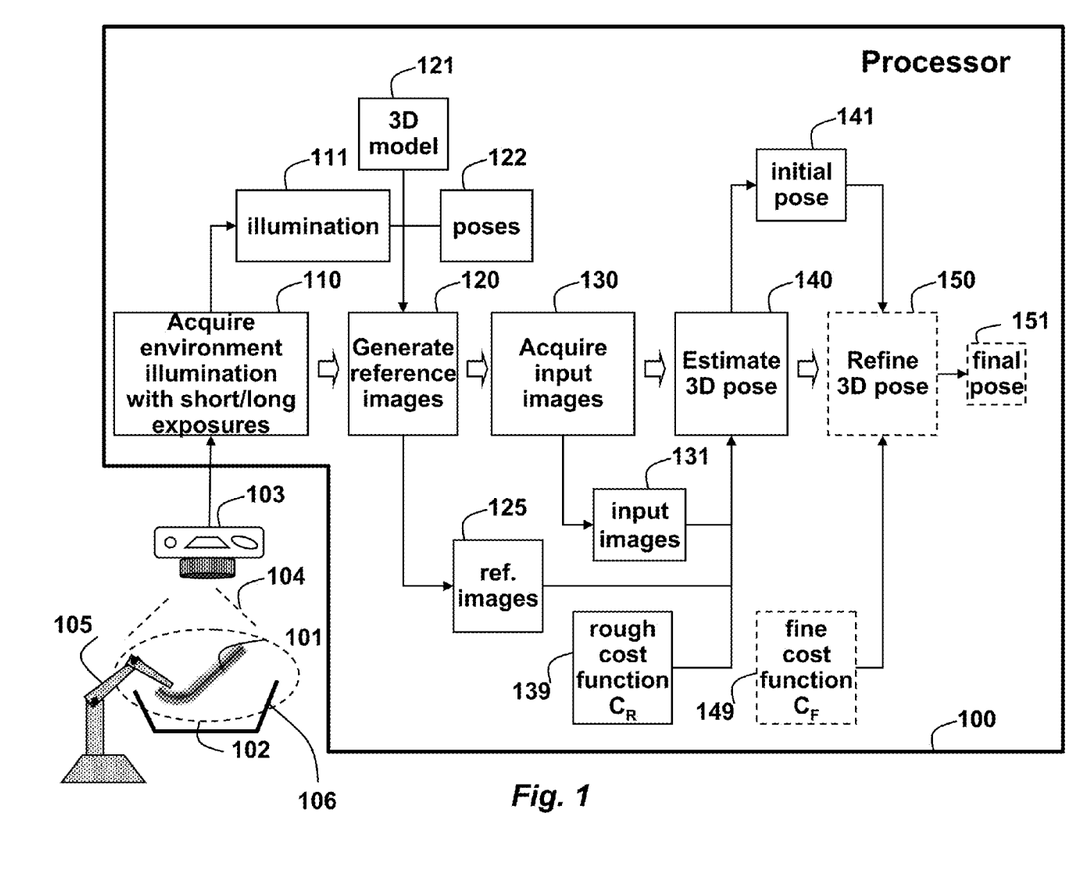
FIG. 1 is a flow diagram of a method for estimating a 3D pose of a specular object using specular intensity information according to embodiments of the invention.

FIG. 1 is a flow diagram of a method, performed in a processor 100 for estimating a 3D pose of an object 101 in an environment 102, wherein the object has a specular surface. In this embodiment, features are specular intensity. If three (RGB) channels are used, then the combined specular intensities have a color. Two-dimensional (2D) images of the environment are acquired by a camera 103. In one embodiment, the camera has a high dynamic range (HDR). Alternatively, the camera can use polarization to estimate specular components.

The 3D pose is defined by a 3D translation vector (X, Y, Z) in a coordinate system of the camera, and 3D Euler angles ($\mu$, $\phi$, $\sigma$) for the orientation.

In one application, the 3D pose is used to pick the object out of a bin 106 using a robot arm 105. For example, in a manufacturing application a bin contains multiple identical objects, which are picked and manipulated one at a time according to their estimated poses. In this embodiment, it would be advantageous to mount the camera on the robot arm.

The object is textureless and highly specular such as a shiny metallic object, with a mirror-like surface. Thus, the only data available to the method are specular reflections on the object in the 2D images. The distance between the object and the camera is $Z \approx Z_0$. This distance can be used to determine a scale of projection. Furthermore, this distance can also be estimated using laser projection, stereo cameras or any other prior methods.

The method uses low level features in 2D images to estimate the 3D pose as follows. The method generates the reference image 125 from the 3D model 121 using a bidirectional reflectance distribution function (BRDF) of the expected surface reflectance for a large number of possible pose variations 122. The steps 110 and 120 can be one time preprocessing steps. If the BRDF of the object is known, that BRDF can be used to generate the images.

The 2D input images 131 are acquired by the camera system and then compared with the reference images to determine the best matching 3D pose 151 of the specular object. The model can be a CAD/CAM, polygon, or any other suitable model.

Specular Intensity Features

In one embodiment, a small mirror-like sphere is arranged in the environment 102 with or without the object. The 2D image acquired of this mirror-like sphere can then be used to generate environment maps 111, which represents illumination information.

In another embodiment a set of camera images of the environment are registered in order to produce a mosaic (or a panoramic view) of the environment. This mosaic or panorama of the environment can be used to produce environment maps 111, which represents environment illumination information.

This illumination information can be used to generate 120 the reference specular images 125, which are used for the comparison with the input images.

The environment illumination can have multiple light sources, e.g., ceiling lights, windows, or lights on the bin. In addition, the lights can have different colors, e.g., red, green and blue, in which case the cost functions are computed independently for each light color. Then, the pose is obtained to minimize the summed R, G, and B cost functions.

The environment illumination can also be actively enhanced and manipulated using light sources, for example by projecting patterns on ceilings from single or multiple projectors.

Specular Flow Features

In another embodiment, the method uses specular flow as features. The specular flow is defined as the optical flow induced by motion of the object, camera, or environment. The specular flow does not depend on changing the lighting conditions but on the motion, the shape, and pose of the object. Therefore, specular flows can be used as illumination invariant features for the pose estimation.

Environment Map Based Approach

As shown in FIG. 1, before estimating the 3D pose of the object, a pair of environment maps EL and ES 111 are acquired 110 of the environment 102 by processing images of a spherical mirror-like object. The maps have long and short exposures, respectively, e.g., about ¼ second and 1/60 second. The input images IL and IS 131 are acquired 130 at the same long and short exposures. Alternatively, the EL and Es images, and IL and IS images, could be obtained from a single image acquired using for a HDR camera 103 followed by processing simulation long and short exposure.

Initial Pose Estimation

Generating Reference Specular Images:

From the 3D model 121 of the object and the pair of environment maps EL and ES 111, the reference images 125 are generated for a large number of predefined poses 122 that correspond to possible poses of the object.

To this end, the Euler angles are uniformly and densely sampled to define a large number of poses, e.g., 25,000. The reference images are RL and RS for various Euler angles ($\mu$, $\phi$, $\sigma$) at a location (0, 0, $Z_0$). By ignoring inter-reflection and self-shadowing, perfect specular reflection images can be generated from EL and ES by applying the reflection mapping, which is a special case of texture mapping.

The reference images could also be generated by non-uniform sampling of poses, which could also depend on the pose distribution of the given object.

The reference specular images 125 depend on the 3D location, as well as the orientation of the object with respect to the camera. However, the camera has a small field of view 104, and the depth of the object is known. Therefore the differences between the reference specular images generated from different 3D locations can be ignored. This is sufficient for initial pose estimation 140. It should be noted, that the input images can also be obtained from multiple views for better accuracy.

The input images 131 are compared with the reference specular images 125 to estimate 140 the 3D pose 141 by solving $$(\hat{X}, \hat{Y}, \hat{\theta}, \hat{\phi}, \hat{\sigma}) = \operatorname*{argmin}_{\theta,\phi,\sigma}\left(\min_{X,Y} C_R(I_L, I_S, R^L_{\theta,\phi,\sigma}, R^S_{\theta,\phi,\sigma}, X, Y)\right), \quad (1)$$

where $(\hat{X}, \hat{Y}, \hat{\theta}, \hat{\phi}, \hat{\sigma})$ denotes the initial pose 141, $C_R(\ )$ is a rough cost function 139 for the comparing, and arg min is a function that returns arguments that produce a minimum value, and the inner minimum is determined before the outer minimum. It is understood that if the predefined reference poses are sampled more finely, e.g. 1,000,000 poses, then the initial pose estimate need not be considered rough, and need not be refined.

The cost function 139 is $$C_R(I_L, I_S, R^L_{\theta,\phi,\sigma}, R^S_{\theta,\phi,\sigma}, X, Y) = (1-\lambda)C_1(I_S, R^S_{\theta,\phi,\sigma}, X, Y) + \lambda C_2(I_L, R^L_{\theta,\phi,\sigma}, X, Y), \quad (2)$$

where $\lambda$ is a control parameter, and $C_1(\ )$ and $C_2(\ )$ are the cost functions for the long and short exposure images, respectively. To obtain these terms, the 3D translation vector (X, Y, $Z_0$) is projected onto the 2D image plane, and the reference image is moved to a projected point (x, y). Then, each pair of translated reference images is compared with the corresponding pair of input images.

As used herein, the cost functions measure the degree to which input and reference image features (specular intensities or specular flows) are well matched for each reference pose.

Highlight Pixels Based Cost Function:

In general, specular images include highlight pixels and non-highlight pixels. The highlight pixels correspond to light sources, such as lamps or windows, with a high intensity incident light. Thus, the pixel values are usually saturated.

The highlight pixels are used for the first term $C_1(\ )$. Because the object is highly specular, the highlight pixels can be extracted by applying thresholding to the short exposure image (or the HDR image) to produce a binary image.

The binary images and a distance transform are used to construct distance images DI and DR corresponding to the input and reference highlight images, respectively. This distance transform helps to match the binary images accurately. Then, the cost function $C_1(\ )$ is defined as $$C_1(I_S, R^S_{\theta,\phi,\sigma}, X, Y) = \frac{1}{N_{highlight}} \sum_{(u,v)} |D_I(u, v) - D_R(u-x, v-y)|^2, \quad (3)$$

where (u, v) are pixel coordinates and $N_{highlight}$ denotes the number of pixels where the summation is carried out. The reference highlight pixels and their 1-pixel neighbors are used as a stencil for the computation.

It is understood that one can generate more than one pair of DI and DR images using a new thresholds to produce binary images. The cost is modified to consider all such pairs simultaneously.

This highlight based cost function has following advantages. First, the highlights are usually very sparse in the input image, so they can be used as a strong constraint for the object's location. Second, the cost function is smoother than that of the conventional cost functions using full specular pixels. Third, the stencil of the highlight contains a very small number of pixels, so computing this cost can be done efficiently. The minimization can be performed using any appropriate optimization procedure. In one embodiment, downhill simplex minimization is used. The downhill simplex minimization procedure converges well to a global minimum very rapidly and stably.

Full Specular Pixels Based Cost Function:

The second term $C_2(\ )$ considers full specular pixels $$C_2(I_L, R^L_{\theta,\phi,\sigma}, X, Y) = 1 - NCC(I_L(u, v), R^L_{\theta,\phi,\sigma}(u-x, v-y)), \quad (4)$$

where NCC denotes normalized cross correlation (NCC). Here, the object's segmentation mask can be used as the stencil for the NCC. However, using only geometrically reliable specular pixels as the stencil produces better results in practice.

It is understood that to deal with a large dynamic range, the pixel intensities maybe transformed to a new space, e.g. a logarithmic response (or exponential response), before cost computation, so that specular pixels get less (or more) importance.

Figure 3:
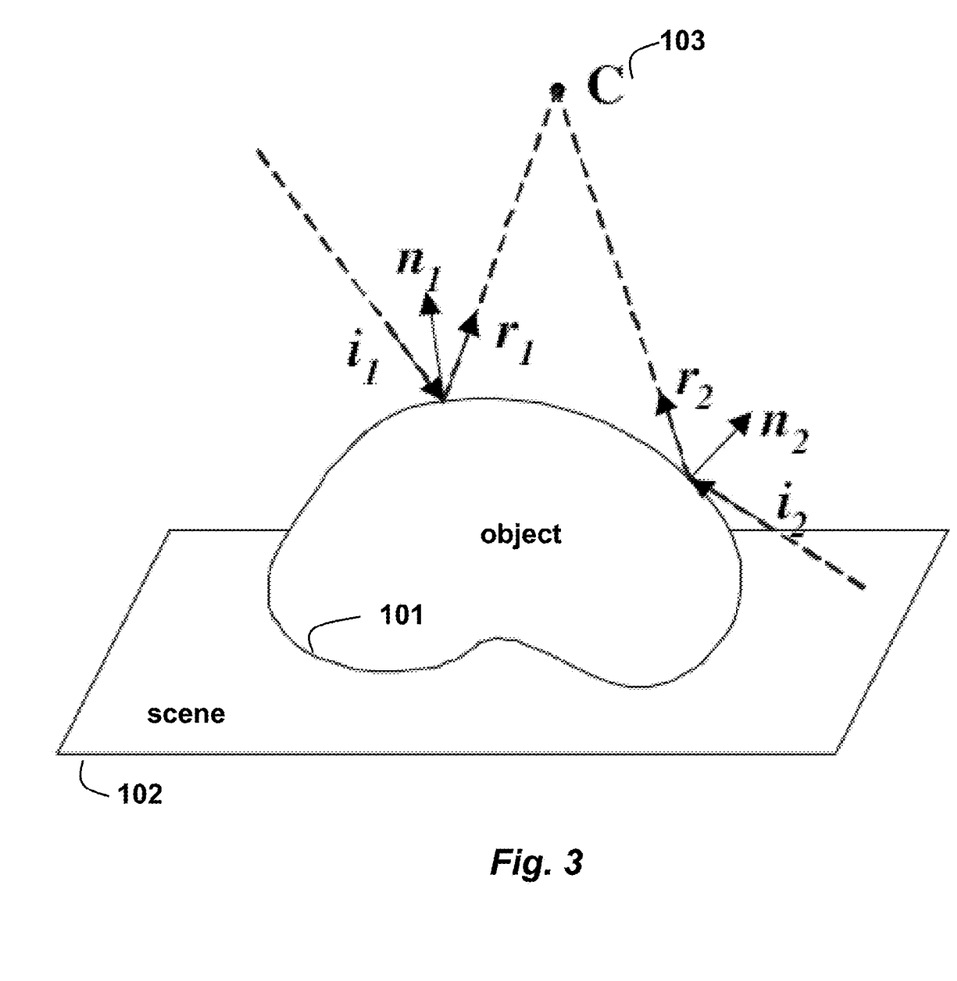
FIG. 3 is a schematic of stencil selection using incident rays according to embodiments of the invention.

As shown in FIG. 3, the geometric stencil selection is as follows. First, an incident light ray $\hat{i}$ is estimated for each pixel in the reference image, knowing the reflected light ray $\hat{r}$ and its surface normal $\hat{n}$. From the law of the reflection, the incident light ray is represented by $$\hat{i} = \hat{r} - 2(\hat{n}\cdot\hat{r})\hat{n}.$$

Figure 4:
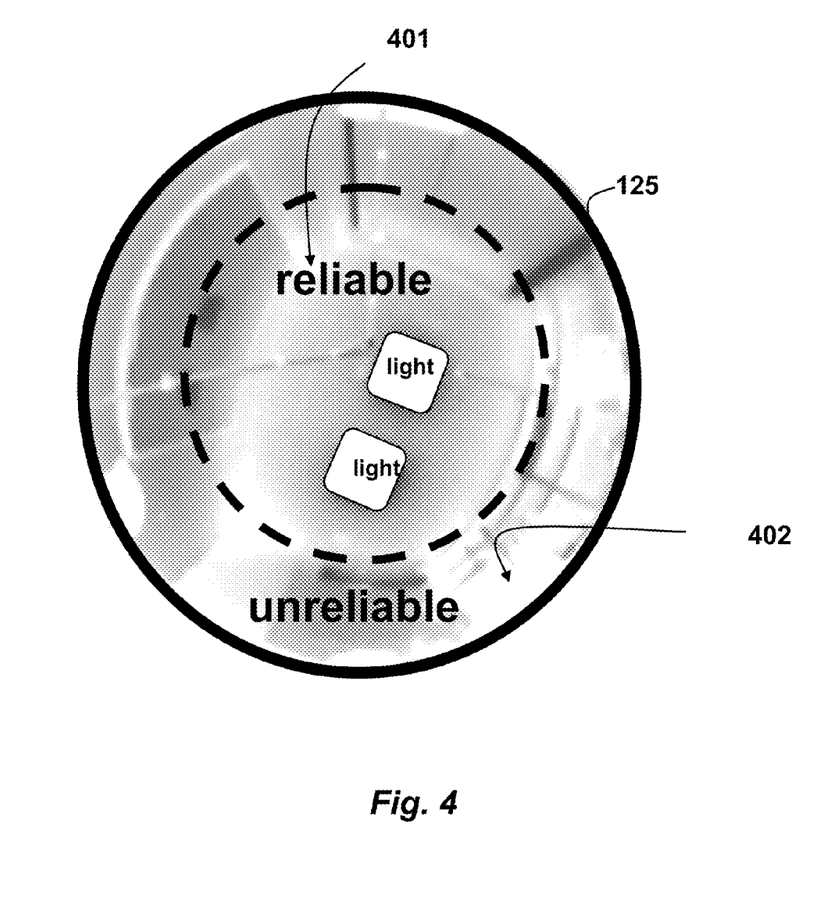
FIG. 4 is an example of reference image having reliable and unreliable pixels.

Then, the reliability of the pixel information can be defined by considering the illumination direction. As shown in FIG. 4 for an example reference image 125, illuminations from $i_1$ are reliable 401, and from $i_2$ are unreliable. The illumination direction is represented by elevation ($\cos^{-1} \hat{i}_z$), and azimuth ($\tan^{-1}\hat{i}_y/\hat{i}_x$) angles in the camera coordinate system.

The illumination with the small elevation angle is usually more unreliable than that with the large elevation angle because of inter-reflections between the specular objects and environment map changes, such as using a different background in the environment. Finally, for the stencil in Equation (4), only the reliable specular pixels are used, i.e., pixels with incident light rays at elevation angles larger than 90°.

Overall Procedures

The overall method for pose estimation is as follows. First, the reference specular images 125 are generated. For each possible pose 122, the optimal translation parameters are obtained. As the initial points for the downhill simplex procedure, arbitrary three corner points of the input image are used. The control parameter $\lambda$ is changed from 0 to 1, which means that translation is roughly optimized by using only highlight pixels, and then subsequently also improved by considering full specular pixels. After translation optimization, there are many translation optimized poses and their associated cost values. The minimal cost value is for the optimal rotation parameters $(\hat{\theta}, \hat{\phi}, \hat{\sigma})$.

Optional Pose Refinement

After estimating 140 the initial rough pose 141, the pose parameters can be further refined 150 by continuously optimizing the pose parameters. Translational pose is already continuously optimized by the downhill simplex procedure in the rough pose estimation, so only the rotational pose needs to be refined using the following cost function 149:

$$C_F(\theta, \phi, \sigma) = 1 - NCC(I_L(u, v), R_{\theta, \phi, \sigma, X, Y}(u, v)), \quad (5)$$

where R is the reference image obtained with the long exposed environment map EL. This optimization uses a steepest descent procedure.

Specular Flow Based Approach

Figure 2:
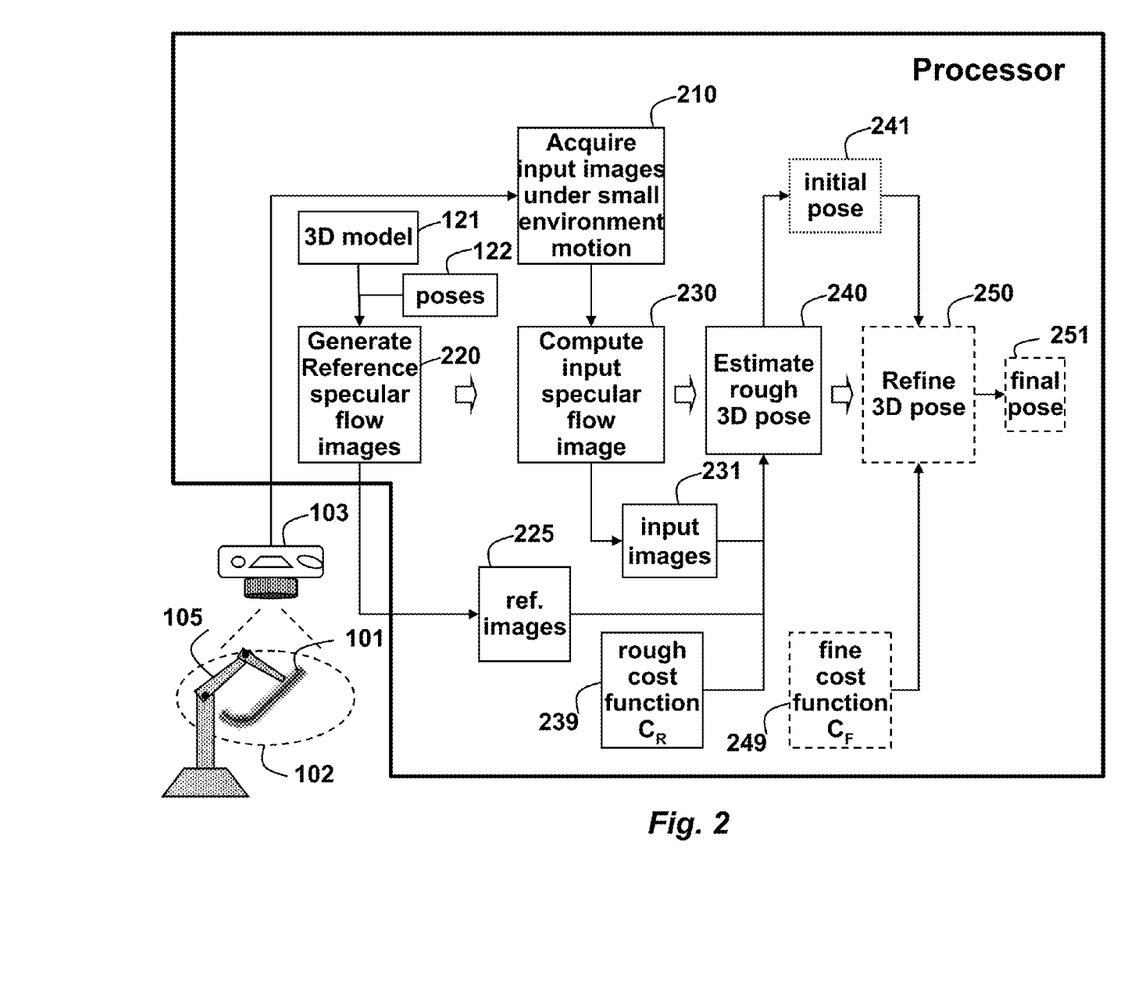
FIG. 2 is a flow diagram of a method for estimating a 3D pose of a specular object using specular flow information according to embodiments of the invention.

FIG. 2 shows the method where the optical flow is used as the feature for matching. In general, the optical flow is the pattern of apparent motion in the environment caused by the relative motion between camera and the environment. In this embodiment, the optical flow is assumed to be induced either by environment motion or via camera motion.

Two input images are generated 210 under a predefined small rotation of environment around a known direction, e.g. the viewing direction of the camera 103. Alternatively, more than two images can be used.

Then, the specular flow between these two images is determined to obtain the input specular flow image I 231 containing 2D displacement vectors for each pixel. A block matching procedure is used to determine the specular flow.

In general, the specular flow can be induced by motion of the object 101, the environment 102, or the camera 103. For simplicity of this description, only environment motion is described but it is assumed that specular flow could have been induced by motion of object 101, the environment 102, or the camera 103. Because the relative pose between camera and object is fixed, specular flow is only observed in the specular pixels. Therefore, this motion cue, which indicates whether the specular flow is present or not, can be used for strongly constraining the location of the object.

Pose Estimation

Generating Reference Specular Flows:

For rough pose estimation 240, at each one of various poses 122, two or more specular images are generated 220 for locations (0, 0, Z0), as before, but this time using a color coded environment map, which is slightly rotating, e.g., 5±degrees. The color coded environment is simulated rather than measured. The color coded environment enables the determination of exact pixel correspondences between two images so that optical flow is easily and completely calculated. The resultant optical flow image is used to generate the reference images R 225.

Pose Optimization:

The reference images 225 are compared with acquired 230 input specular flow image I 231, and the 3D pose 241 is estimated 240 by minimizing a cost function 239:

$$C_R(I, R_{\theta, \phi, \sigma}, X, Y) = (1-\lambda) C_1(I, R_{\theta, \phi, \sigma}, X, Y) + C_2(I, R_{\theta, \phi, \sigma}, X, Y), \quad (6)$$

where C1( ) and C2( ) are cost functions based on motion segmentation and specular flow, respectively. An optimization procedure is used to compute the translation and rotation estimates that minimize the cost function. In one embodiment, the translation (X, Y) is first optimized for each rotation using the downhill simplex procedure. Then, the rotation is optimized by comparing all cost values.

Motion Segmentation Based Cost Function:

Motion segmentation is defined as a binary image indicating whether there is a nonzero specular flow or not for each pixel. Let $D_I$ and $D_R$ denote the distance transformed images constructed from motion segmentation of input image I 231, and the reference specular flow image R 225. The cost function C1( ) is $$C_1(I, R_{\theta, \phi, \sigma}, X, Y) = \frac{1}{N_{motion}} \sum_{(u,v)} |D_I(u, v) - D_R(u-x, v-y)|^2, \quad (7)$$

where the summation is carried out for motion segmentation pixels of the reference image R, and $N_{motion}$ denotes the number of such pixels. It is understood that the pose estimation and the object segmentation can be performed concurrently.

Specular Flow Based Cost Function:

The second cost term $C_2()$ in Equation (6) is constructed by comparing the input image I(u, v) 231 with a translated reference image R 225. The input image contains many outliers, due to noisy and textureless regions in practical applications. The outlier pixels are those pixels that are inconsistent with other (inlier) pixels in the image. Therefore, a simple matching cost such as sum of squared differences (SSD) does not work well. Instead, the cost function is based on the number of inlier pixels.

First, the inlier pixels are pixels where the difference between the input specular flow vector I(u, v) and the reference specular flow vector R is less than a small threshold, e.g., 1.0. The cost function $C_2()$ is $$C_2(I, R_{\theta, \phi, \sigma}, X, Y) = -|M|, \quad (8)$$

where M is the set of inlier pixels.

Overall Procedures:

The specular flow based approach uses the same overall method as the one based on specular intensity. Reference images 225 are generated using the model 121 and the possible poses 122. An optimal translation is estimated for each reference image using the downhill simplex procedure. Here, the control parameter varies from 0 to 1. Then, all translation optimized poses are compared to determine the optimal rotation.

Optional Pose Refinement

After estimating 240 the rough pose 241, the rotational pose parameters are optionally continuously refined 250 by minimizing a cost function 249:

$$C_F(\theta, \phi, \sigma) = \frac{1}{N_{mask}} \sum_{(u,v)} |I(u, v) - R_{\theta, \phi, \sigma, X, Y}(u, v)|^2, \quad (9)$$

where R is the reference image, with pose parameter (θ, φ, σ, X, Y) and $N_{mask}$ denotes the number of pixels in the stencil, which is defined as the object segmentation mask.

Effect of the Invention

The invention exploits specular reflection to globally estimate a 3D pose of a 3D object, using a 3D model of the object. The method can work with challenging objects, such as textureless and highly specular objects. The method uses simple matching cost functions and optimization procedures, so that the method can be implemented on a graphic processor unit (GPU) to improve performance.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

We claim:

1. A method for estimating a 3D pose of a 3D object in an environment, comprising the steps of:
   rendering a set of pairs of 2D reference images using a 3D model of the object, wherein the object has a specular surface, and a set of poses of the object, wherein each pair of reference images is associated with one of the poses;
   acquiring a pair of 2D input images of the object; and
   estimating a 3D pose of the object by comparing features in the pair of 2D input images and features in each pair of 2D reference images using a cost function matching the features, wherein the features are specular flows, wherein the steps are performed in a processor.

2. currently amended) The method of claim 1 where the 2D input images are obtained from a single image acquired by a camera with a non-linear intensity response.

3. The method of claim 1, wherein the 3D pose is defined by a 3D translation vector (X, Y, Z), and 3D Euler angles ($\mu$, $\phi$, $\sigma$) for orientation.

4. The method of claim 1, further comprising:
   refining the pose using a fine cost function.

5. The method of claim 1, wherein the features are obtained by image processing intensities due to specular reflection.

6. The method of claim 5, wherein reference specular intensities are rendered by using a mirror bidirectional reflectance distribution function (BRDF), or some other known BRDF.

7. The method of claim 6, wherein the reflectance is mirror-like.

8. The method of claim 6, wherein the other known BRDF is of the object.

9. The method of claim 5, further comprising:
   arranging a mirror-like sphere in the environment;
   acquiring an environment map image via reflection of the environment in the mirror-like sphere;
   constructing an environment map from the environment map image, using a 2D plenoptic function, which models appearance of the surrounding, and wherein the reference images are rendered from a 3D model of the object reflecting the environment map.

10. The method of claim 9, further comprising:
    acquiring a set of images of the environment and generating a mosaic from the set of images in order to construct the environment map.

11. The method of claim 5, wherein the pose is obtained by solving $$(\hat{X}, \hat{Y}, \hat{\theta}, \hat{\phi}, \hat{\sigma}) = \underset{\theta,\phi,\sigma}{\arg\min}\left(\min_{X,Y} C_R(I_L, I_S, R^L_{\theta,\phi,\sigma}, R^S_{\theta,\phi,\sigma}, X, Y)\right),$$

where $(\hat{X}, \hat{Y}, \hat{\theta}, \hat{\phi}, \hat{\sigma})$ denotes translation and Euler angles of the initial pose, and CR( ) is a rough cost function, $I_L$ and $R^L$ are long exposure input image and reference images, and $I_S$ is a short exposure input image and $R^S$ is a reference image, and arg min is a function that returns the arguments that provide a minimum value, and an inner minimum is determined before an outer minimum.

12. The method of claim 11, wherein the rough function is $$C_R(I_L, I_S, R^L_{\theta,\phi,\sigma}, R^S_{\theta,\phi,\sigma}, X, Y) = (1-\lambda)C_1(I_S, R^S_{\theta,\phi,\sigma}, X, Y) + \lambda C_2(I_L, R^L_{\theta,\phi,\sigma}, X, Y),$$

where $\lambda$ is a control parameter, and $C_1($ ) and $C_2($ ) are cost functions for a long exposure image and a short exposure image, respectively.

13. The method of claim 12, wherein highlight pixels are used for $C_1($ ) and the highlight pixels are determined by thresholding to produce a corresponding binary image, and further comprising:
    constructing corresponding reference distance image $D_R$ and input distance image $D_I$ by application of a distance transform to the binary images.

14. The method of claim 13, wherein the cost function $C_1($ ) is $$C_1(I_S, R^S_{\theta,\phi,\sigma}, X, Y) = \frac{1}{N_{highlight}}\sum_{(u,v)} |D_I(u, v) - D_R(u-x, v-y)|^2,$$

where (x, y) are projection points, (u, v) are pixel coordinates, $N_{highlight}$ denotes a number of pixels for the summation, and S denotes a short exposure.

15. The method of claim 12, wherein the cost function C2( ) is $$C_2(I_L, R^L_{\theta,\phi,\sigma}, X, Y) = 1 - NCC(I_L(u, v), R^L_{\theta,\phi,\sigma}(u-x, v-y)),$$

where NCC denotes normalized cross correlation, and L denotes a long exposure.

16. The method of claim 15, wherein (X, Y) denotes translation and ($\mu$, $\phi$, $\sigma$) denote Euler angles of the fine pose, and wherein the fine cost function is $$C_F(\theta,\phi,\sigma) = 1 - NCC(I_L(u, v), R_{\theta,\phi,\sigma, X, Y}(u, v)),$$

where (u, v) are pixel coordinates of the input image I and the reference images R, NCC denotes normalized cross correlation, and L denotes a long exposure.

17. The method of claim 1, wherein exposures used while acquiring the input images are different.

18. The method of claim 17, wherein a short exposure is about 1/60 second and a long exposure is about 1/4 second, and a camera aperture is adjusted for ambient illumination so that the long exposure produces an image with normal intensity.

19. The method of claim 1, wherein the specular flows are due to a rotation of the environment around a predetermined viewing direction of a camera acquiring the 2D input images.

20. The method of claim 19, wherein the rotation is about 5± degrees.

21. The method of claim 1, wherein the specular flows are determined using block matching and a color coded environment map.

22. The method of claim 1, wherein (X, Y) denotes translation and ($\mu$, $\phi$, $\sigma$) denote Euler angles of the pose, and the rough cost function is $$C_1(I, R_{\theta,\phi,\sigma}, X, Y) = \frac{1}{N_{motion}}\sum_{(u,v)} |D_I(u, v) - D_R(u-x, v-y)|^2,$$

where $\lambda$ is a control parameter, and C1( ) and C2( ) are cost functions based on motion segmentation and the specular flows, respectively, and R and I represent the reference images and the input images, respectively.

23. The method of claim 22 further comprising:
    constructing corresponding reference distance image $D_R$ and input distance image $D_1$ from the binary images obtained by thresholding magnitudes of specular flows and a distance transform, and wherein the cost function C1( ) is $$C_1(I, R_{\theta,\phi,\sigma}, X, Y) = \frac{1}{N_{motion}} \sum_{(u,v)} |D_I(u, v) - D_R(u - x, v - y)|^2,$$

where (x, y) are projection points, (u, v) are pixel coordinates, the summation is carried out for motion segmentation pixels of the reference image R, and $N_{motion}$ denotes a number of such pixels.

24. The method of claim 22, further comprising:
comparing the reference image R and input image I, finding inlier pixels where a difference between an input specular flow vector and a reference specular flow vector is less than a small threshold, and wherein the cost function C2( ) is $C_2(I, R_{\theta,\phi,\sigma}, X, Y) = -|M|$ where M is the set of inlier pixels.

25. The method of claim 1, where (X, Y) represents translation and (μ, φ, σ) represent Euler angles of the 3D pose and a fine cost function is $$C_F(\theta, \phi, \sigma) = \frac{1}{N_{mask}} \sum_{(u,v)} |I(u, v) - R_{\theta,\phi,\sigma,X,Y}(u, v)|^2,$$

where (u, v) are pixel coordinates, R is the reference image, with the pose parameter (θ, φ, σ, X, Y), and $N_{mask}$ denotes a number of a stencil, which is defined as an object segmentation mask.

26. The method of claim 1, wherein each pair of 2D input images is generated from a single high dynamic range image.

27. The method of claim 1, wherein each pair of 2D input images is generated from a set of images collected with varying exposures.

28. The method of claim 1, further comprising:
picking the object out of a bin using a robot arm according to the estimated pose.

29. The method of claim 28, wherein the bin includes a single or multiple objects.

30. The method of claim 28, wherein the input images are acquired by a camera mounted on the robot arm.

31. The method of claim 28, where the bin includes active lighting.

32. The method of claim 1, wherein the 3D pose has six degrees of freedom.

33. The method of claim 1, further comprising:
segmenting the object in the input images while estimating the pose.

34. The method of claim 1, further comprising:
estimating a reflectance of the object in the input images while estimating the pose.

35. The method of claim 1, wherein the input images are acquired from multiple views of the object.

36. The method of claim 1, further comprising:
actively illuminating the environment with an illumination source.

37. The method of claim 36, where the illumination source includes one or more projectors.

38. The method of claim 1, where the input images are acquired using polarization to estimate specular components.

39. The method of claim 1, further comprising:
illuminating the environment with different colors, and performing the method independently for each color.

40. An apparatus for estimating a 3D pose of a 3D object in an environment, wherein the object has a specular surface, comprising:
means for generating a set of pairs of 2D reference images using a 3D model of the object, and a set of poses of the object, wherein each pair of reference images is associated with one of the poses;
a camera configure to acquire a pair of 2D input images of the object; and
means, implemented in a processor, for estimating a 3D pose of the object by comparing features in the pair of 2D input images and features in each pair of 2D reference images using a cost function matching the features, wherein the features are specular flows.

* * * * *